United States Patent
Hoelen et al.

(10) Patent No.: US 12,208,297 B2
(45) Date of Patent: Jan. 28, 2025

(54) SYSTEMS AND METHODS FOR TREATING CONTAMINATED SOLID MATERIAL

(71) Applicant: Chevron U.S.A. Inc., San Ramon, CA (US)

(72) Inventors: Thomas P. Hoelen, Berkeley, CA (US); Cesar Ovalles, Walnut Creel, CA (US); Adam J. Dassey, Houston, TX (US); Carl W. Lam, San Ramon, CA (US); Russell E. Cooper, Martinez, CA (US); Janelle L. Lewis, Spring, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 18/590,894

(22) Filed: Feb. 28, 2024

(65) Prior Publication Data
US 2024/0424334 A1    Dec. 26, 2024

Related U.S. Application Data

(63) Continuation of application No. 16/596,893, filed on Oct. 9, 2019, now abandoned.

(51) Int. Cl.
| | |
|---|---|
| *A62D 3/40* | (2007.01) |
| *A62D 3/15* | (2007.01) |
| *B01D 46/02* | (2006.01) |
| *B01D 53/00* | (2006.01) |
| *B01D 53/18* | (2006.01) |
| *B01D 53/40* | (2006.01) |
| *B01D 53/78* | (2006.01) |

(52) U.S. Cl.
CPC .......... *A62D 3/15* (2013.01); *A62D 3/40* (2013.01); *B01D 46/02* (2013.01); *B01D 53/002* (2013.01); *B01D 53/18* (2013.01); *B01D 53/40* (2013.01); *B01D 53/78* (2013.01); *B01D 2258/02* (2013.01)

(58) Field of Classification Search
CPC . A62D 3/15; A62D 3/40; B01D 46/02; B01D 53/002; B01D 53/18; B01D 53/40; B01D 53/78; B01D 2258/02
See application file for complete search history.

(56) References Cited

U.S. PATENT DOCUMENTS

| | | | |
|---|---|---|---|
| 2006/0159605 A1* | 7/2006 | Seames | C22B 7/001 423/594.18 |
| 2010/0075830 A1* | 3/2010 | Hwang | B01J 20/3416 502/56 |

* cited by examiner

*Primary Examiner* — Christopher P Jones
*Assistant Examiner* — Phillip Y Shao
(74) *Attorney, Agent, or Firm* — Jason M. Guerrero

(57) ABSTRACT

Disclosed are systems and methods for treating contaminated material. The material is heated by nonconductive and nonconvective heating in a vacuum chamber such that the surface of the material is heated without significant heating of the air within the chamber. The surface of the material is heated to at least a volatilization temperature of the contaminants or to a decomposition temperature of one or more compounds in intimate contact with the contaminants, so that the concentration of contaminants in the material is reduced. Exhaust is removed from the chamber and cooled. A solids and/or liquids collector removes condensed solids and/or liquids and has a gas outlet connected to a vacuum pump.

16 Claims, 3 Drawing Sheets

SYSTEMS AND METHODS FOR TREATING CONTAMINATED SOLID MATERIAL

FIELD

The present disclosure relates generally to systems and methods for the treatment of contaminated solid materials in a vacuum chamber using nonconductive and nonconvective heating.

BACKGROUND

Industrial materials such as industrial byproducts and waste materials can be impacted with compounds such as metals, metalloids, nonmetals or organic compounds that are often present on the surface of the materials or incorporated in a surface layer. Examples of such impacted materials include spent catalysts and absorbents from petroleum refining and gas processing operations, corrosion or salt deposits on vessels and pipelines, and produced sand or other waste solids generated from oil and gas production. Removing some or all of these compounds may be desirable before the materials can be reused, recycled, or disposed. Current methods to remove such heating compounds from the surface of these materials include high-pressure water blasting, sandblasting, electrical heating, or heating with flames. These methods have a variety of shortcomings that can make them impractical, time and energy intensive and/or cost prohibitive. For example, water jetting and sandblasting are not practical for use with spent catalysts or produced sand. Electrical or flame heating deployed as batch treatment, e.g., in steel or copper smelters or mercury recovery (retort) facilities, often rely on relatively slow heating. These processes heat the entire sample to temperatures at which the surface material boils, sublimated, decomposes or vaporizes. These heating requirements are very time-consuming, may require the use of enhanced cooling systems, and require large amounts of energy, and air treatment of volatile emissions. The heat transfer often occurs through gas phases such as air, which strongly increases the energy requirements and treatment times.

It would be desirable to have an improved method for treating contaminants impacted materials that would be more energy-efficient, faster and more effective than conventional methods.

SUMMARY

In general, in one aspect, the disclosure relates to a system for treating a solid material contaminated with one or more contaminants. The system includes a vacuum chamber for receiving the material; an energy source for applying nonconductive and nonconvective heating to a surface of the material in the vacuum chamber with no significant heating (minimal heating) of the air within the vacuum chamber to reduce the concentration of the one or more contaminants in the material; an exhaust line for removing exhaust from within the vacuum chamber; a condenser connected to the exhaust line for cooling the exhaust removed from the vacuum chamber; a solids and/or liquids collector connected to the condenser by a first conduit for removing condensed solids and/or liquids, the solids and/or liquids collector having a gas outlet; and a vacuum pump connected to the gas outlet by a second conduit.

In another aspect, the disclosure generally relates to a method for treating a solid material contaminated with one or more contaminants. The method includes the steps of: feeding the material to a chamber in communication with a vacuum pump connected to the chamber by an exhaust line for removing an exhaust containing a gas from the chamber; applying nonconductive and nonconvective heating to a surface of the material in the vacuum chamber to raise the temperature of the surface of the material to at least a volatilization or a decomposition temperature of the one or more contaminants, or to a decomposition temperature of one or more compounds in intimate contact with the one or more contaminants, without significant heating of the air within the chamber, thereby releasing the one or more contaminants to a gas phase and reducing a concentration of the one or more contaminants in the material; cooling the exhaust removed from the chamber in a condenser connected to the exhaust line; and collecting solids and/or liquids collector in a solids and/or liquids collector connected to the condenser by a first conduit for removing condensed solids and/or liquids containing the one or more contaminants, the solids and/or liquids collector having a gas outlet wherein the vacuum pump is connected to the gas outlet by a second conduit.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
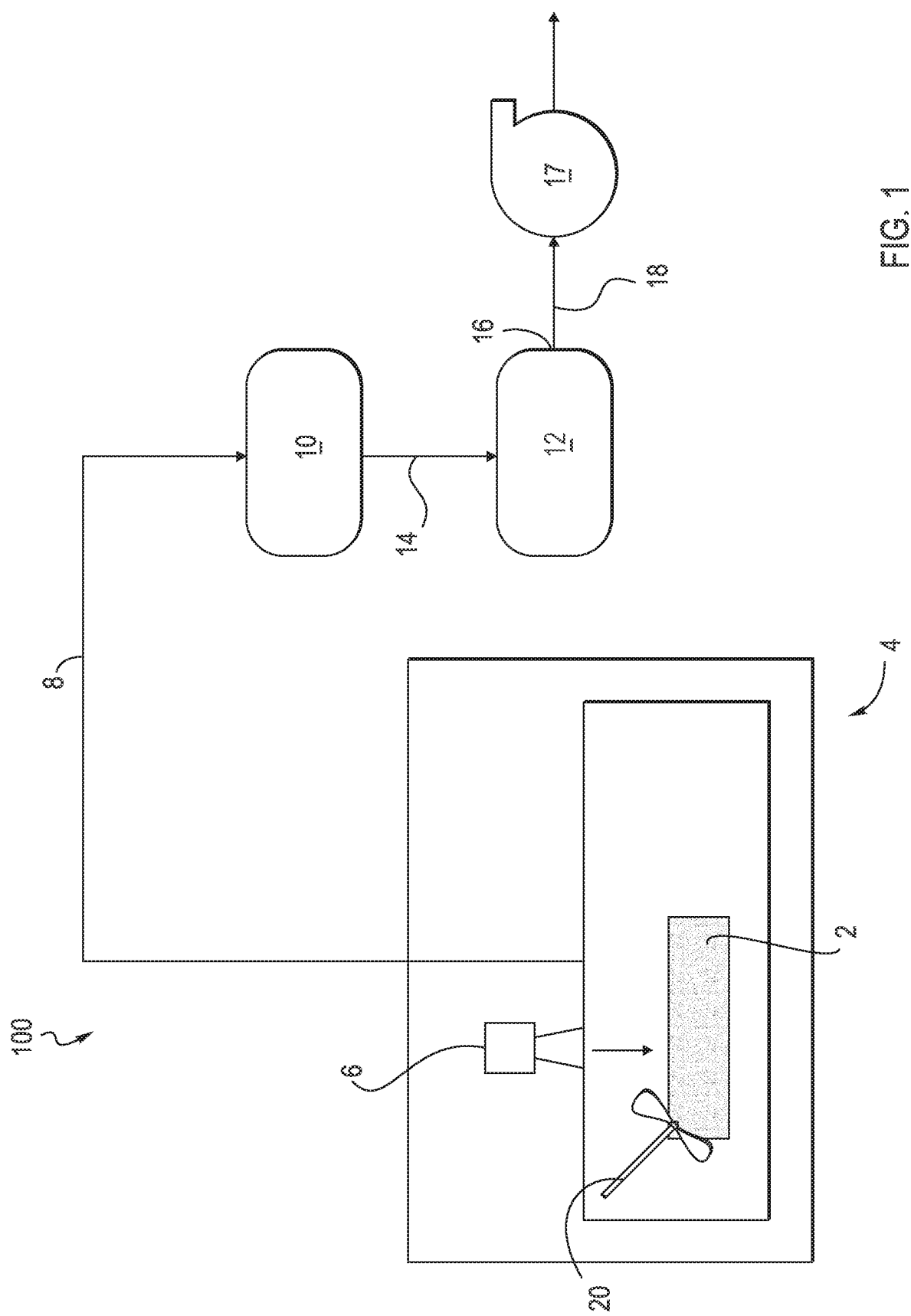
FIG. 1 shows a schematic diagram of a system in which an example embodiment can be applied.

Referring to FIG. 1, a system 100 for treating a solid material 2 (also referred to as material) contaminated with one or more contaminants will be described. In one embodiment, the solid material 2 can be any material that is solid under the operating conditions (i.e., ambient temperature and reduced pressure), preferably not a highly volatile or flammable material. The solid material 2 can be any industrial solid wastes and solid secondary materials, including, as nonlimiting examples, soil, sediment, sludge, spent catalyst, spent absorbents, ceramics, metal particles, metal objects, sheet metal, granulated solid material, binder agglomerated material, sheet material, crystalline material, amorphous material, and combinations thereof. The solid material 2 can be particulate material having a diameter of 2.0 in or less.

In one embodiment, the one or more contaminants in the material 2 can include mercury, asbestos, lead, silicon, selenium, tellurium, cadmium, perfluoroalkyl substances, polyfluoroalkyl substances, and/or a naturally occurring radioactive material (NORM).

A vacuum chamber 4 is used for receiving and containing the solid material 2. The vacuum chamber 4 can be any substantially air-tight solid chamber made from any suitable material. The vacuum chamber 4 can be a chamber in communication with a vacuum pump 17.

An energy source 6 is used for applying nonconductive and nonconvective heating to a surface of the material 2, i.e., an outer thin layer of the material 2, in the vacuum chamber 4 without significant heating of the air within the vacuum chamber 4. By "without significant heating of the air within the vacuum chamber" is meant herein that any heating of the air that may occur will only occur at the surface of the material 2 that is being treated. The energy source 6 can be any source that will heat the surface of the material 2 without using conductive or convective heating. For example, the energy source 6 can be one or more of an electron beam, a laser, an induction heater, a microwave generator, a radio frequency heater, or a combination thereof.

Electron beams (or e-beams or eBeams) use high voltage electricity to accelerate and focus electrons into a beam that collides with a solid surface. The electrons are converted to kinetic energy when they contact the surface and generate heat. This allows for precise heating of the surface. In one embodiment, the energy source 6 is an electron beam with an energy between 0.3 and 50 MeV, even between 3 and 10 MeV. Energy rate and total dosage can be in the ranges of 15-150 kGy/s and up to 20 MGy, respectively. Suitable examples of electron beam devices include but are not limited to those devices used for food sterilization or rubber vulcanization. Such devices typically include an electron gun having a cathode, grid, and anode to generate and accelerate the primary beam and a magnetic optical system to control how and where the electron beam hits the surface.

Lasers use high voltage electricity to excite electrons from lower-energy orbit to high energy orbit. When those electrons return to their normal state, they emit photons which can be directed into a beam at the surface to be cleaned. The laser energy ablates the surface, vaporizing some surface components and creating particulate dust in other components. Suitable examples of laser systems include, but are not limited to, systems that transmit high power laser photons in fiber optic cables, and lasers used for engraving of metals and plastics.

Induction heaters work by passing a high-frequency alternating current through an electromagnet around an object. This generates electric currents inside the object which are met by resistance in the object. This resistance creates heat inside the object which allows for rapid heating. Suitable examples include but are not limited to induction coil systems available from Fluxtrol, Inc., Auburn Hills, Michigan.

Microwave generators and radiofrequency heaters are dielectric heating approaches. Microwave heating uses high frequency short wavelengths. Radiofrequency (RF) heating uses much longer wavelengths. Both methods change the electric field of the material, exciting the molecules to rotate and align with the newly generated field. The rotating molecules collide as they change directions and transfer energy which creates a form of radiative heating. Suitable examples of microwave generators include but are not limited to those used for food processing and rubber manufacturing., Suitable examples of radiofrequency heaters include but are not limited to those used for drying of fiberglass mats and baked goods . . .

An exhaust line 8 removes exhaust that contains at least a gas from the vacuum chamber 4. The exhaust can also contain fine liquid droplets and/or fine solid particulate matter.

A condenser 10 connected to the exhaust line 8 is used for cooling the exhaust removed from the vacuum chamber 4. A solids and/or liquids collector 12 connected to the condenser 10 by a first conduit 14 is used for removing condensed solids and/or liquids. The solids and/or liquids collector 12 has a gas outlet 16 connected to a vacuum pump 17 by a second conduit 18.

In one embodiment, the vacuum chamber 4 is equipped with a means for agitating the solid material 2 in the vacuum chamber 4. The means for agitating 20 can be a mechanical mixer, a mechanical vibrator, a mechanical agitator or a combination thereof. For example, a shaking table such as those used in mining operations could be used to agitate the solid materials in the vacuum chamber.

Figure 3:
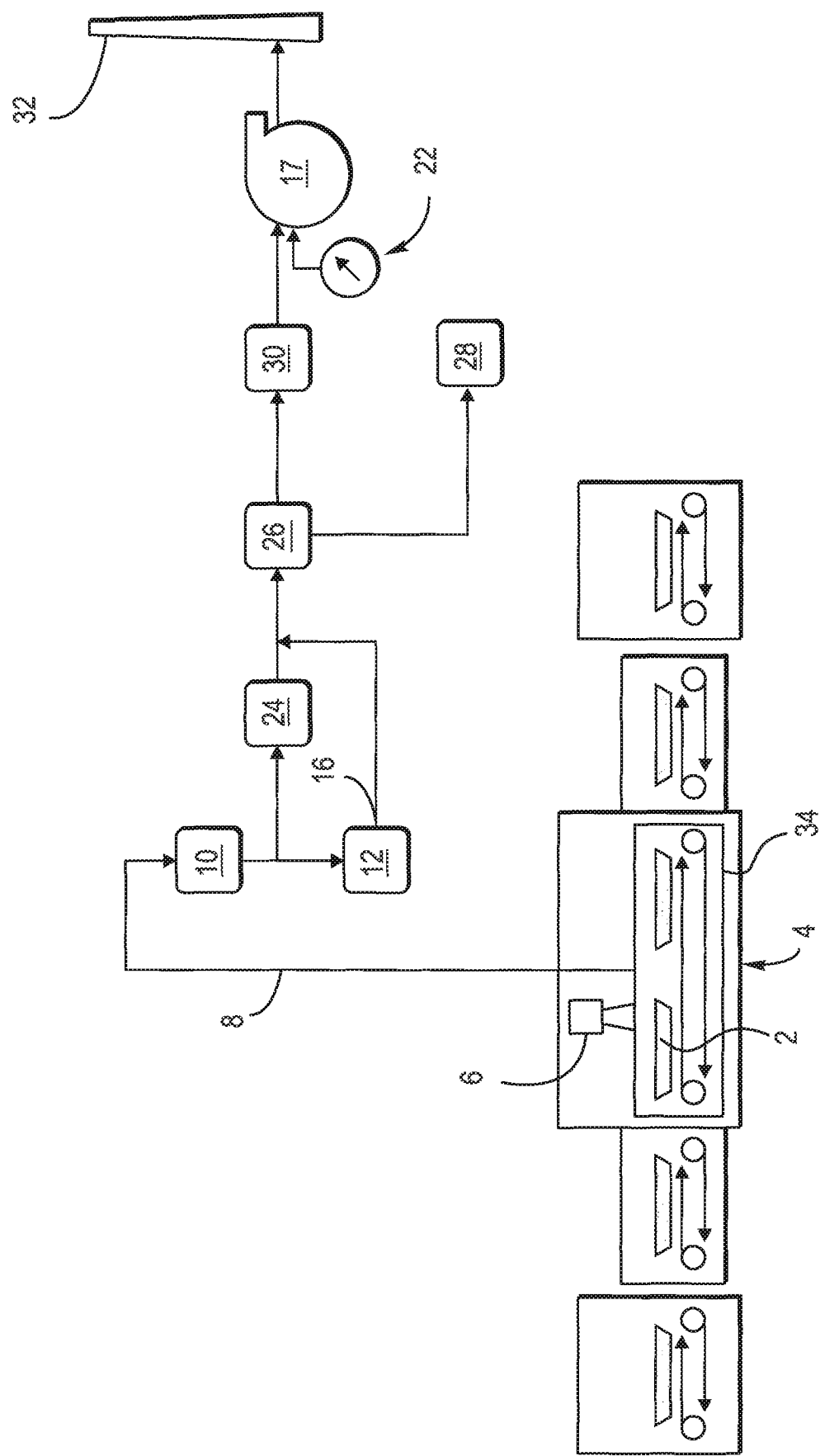
FIG. 3 shows a schematic diagram of a system in which another example embodiment can be applied.

Referring to FIG. 3, a system 300 for treating the contaminated solid material 2 will be described. The system 300 includes all of the components of system 100 with additional optional components for use as needed depending on the material 2 being treated, the contaminants present, and the conditions needed for treatment.

In one embodiment, a pressure monitoring device 22 such as a pressure gauge is used to monitor the pressure in the first conduit 18 between the vacuum pump 17 and the gas outlet 16 of the solids and/or liquids collector 12. In case the pressure is greater than a desired pressure, the vacuum pump 17 can be controlled, e.g., manually or using automatic control, to reduce the pressure and/or the process can be automatically shut down.

In one embodiment, a baghouse filter 24 is connected downstream of the condenser 10 to remove airborne particulate matter from exhaust leaving the condenser 10. This airborne particulate matter may include contaminants that were removed from the treated material 2 or degradation products thereof.

In one embodiment, a wet caustic scrubber 26 is connected downstream of the condenser 10 for removing acid gas components and aerosols from exhaust leaving the condenser 10. In one embodiment, a wastewater treatment unit 28 is connected to the wet caustic scrubber 26 for receiving and treating wastewater removed from exhaust leaving the condenser 10.

In one embodiment, an absorbent and/or cryogenic treatment unit 30 is connected downstream of the condenser 10 for removing mercury and organic carbon vapors from exhaust leaving the condenser 10.

In one embodiment, a stack 32 is connected downstream of the condenser 10 for venting gas.

In one embodiment, the system 300 utilizes a conveyor belt 34 for continuously passing the solid material 2 through the vacuum chamber 4. As shown, additional vacuum entry and exit chambers and loading and unloading stations can be provided as would be apparent to one of ordinary skill in the art.

Figure 2:
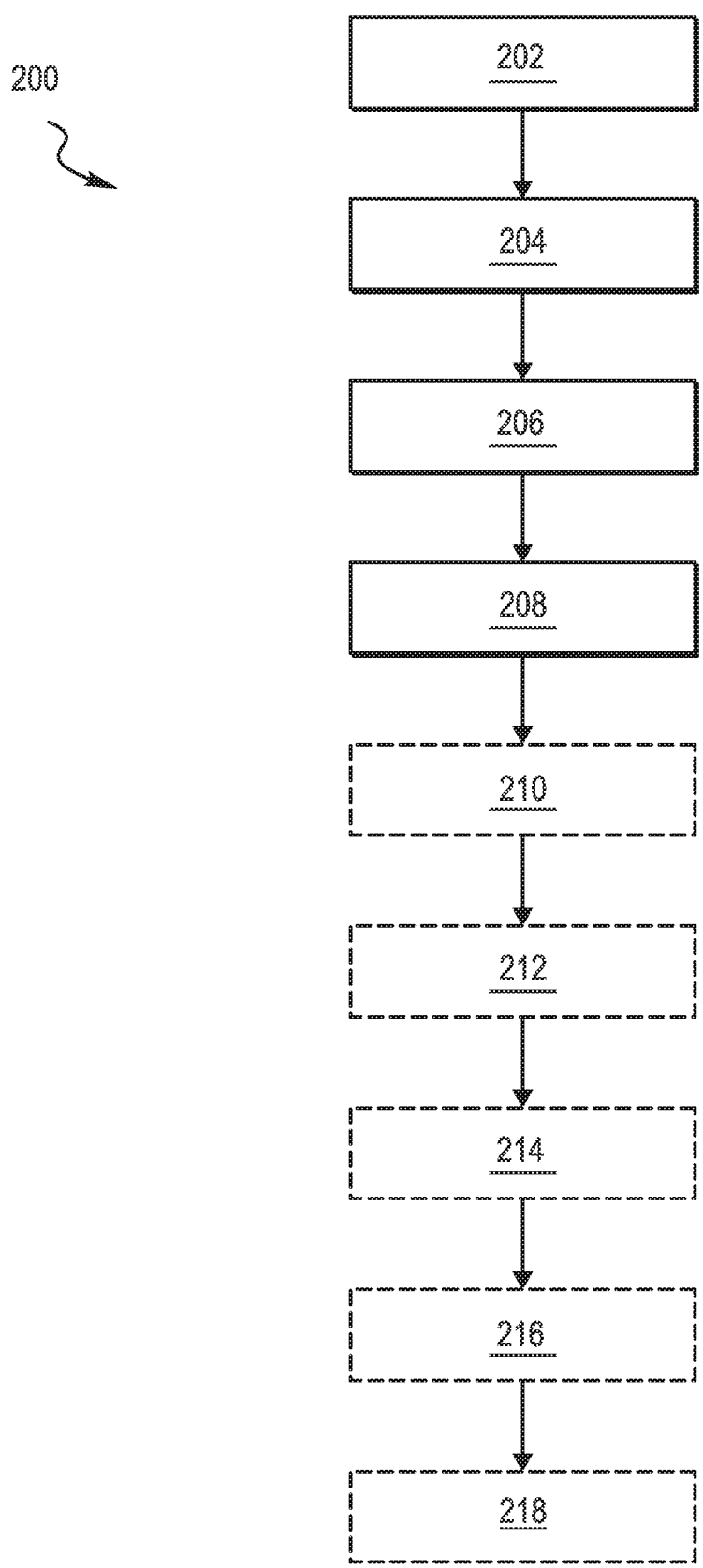
FIG. 2 shows a flow diagram of a method for solid material treatment in accordance with embodiments.

Referring to FIG. 2, a method 200 for treating the contaminated solid material 2 will be described. In step 202, the solid material 2 is fed to the vacuum chamber 4 in communication with the vacuum pump 17 connected to the chamber 4 by the exhaust line 8 for removing exhaust from the chamber 4. The method of claim 15 wherein the solid material is fed to the chamber and removed from the chamber continuously.

In step 204, the surface of the solid material 2 in the chamber 4 is heated by applying nonconductive and nonconvective heating is effected by an energy source 6 as previously described to raise the temperature of the surface of the material 2 to at least a volatilization temperature or a decomposition temperature of the one or more contaminants without significant heating of the air within the chamber 4. In some nonlimiting embodiments, the material treated includes lead on a metal, wood, or concrete surface; asbestos on a metal, wood, or concrete surface; mercury on steel (e.g., pipes or vessels); mercury on spent catalyst or absorbent particulates (e.g. decomposition of mercury sulfide embedded in a copper-based absorbent); NORM on steel (e.g., pipes or vessels); or PFAS on solid particulates e.g., soil or granulated activated carbon (used for removal of PFAS from wastewater). Alternatively, the heating raises the temperature of the surface to at least a decomposition temperature of one or more compounds that is in intimate contact with the one or more contaminants, without significant heating of the air within the chamber 4. The volatilization temperature of the contaminants or the decomposition temperature of the one or more compounds can be at least 200° C., even from 200 to 1000° C. The surface layer of the material 2 that is heated can have a thickness of from 0.3 μm to 1 cm. In this way, the one or more contaminants are released to the gas phase and a concentration of the one or more contaminants in the material 2 is reduced. Step 204 can be conducted in less than 10 seconds. Optionally, the material 2 can be agitated in the chamber 4 during the heating process.

In step 206, exhaust (including gases and possibly aerosols, fine droplets and fine particulate matter) is removed from the chamber 4 using the exhaust line 8 connected to the chamber 4. In step 206, the exhaust is cooled in the condenser 10. In step 208, solids and/or liquids are collected in a solids and/or liquids collector 12 connected to the condenser 10 by a first conduit 14 for removing condensed solids and/or liquids containing the one or more contaminants and/or decomposition products of any decomposed compounds in intimate contact with the one or more contaminants.

A number of optional steps can be performed. In optional step 210, pressure is monitored in the second conduit between the vacuum pump and the gas outlet. In case the monitored pressure is higher than desired, in optional step 212, the vacuum pump 17 can be controlled to reduce the pressure and/or the process can be automatically shut down. In optional step 214, dust can be removed from gas leaving the condenser 10 using a baghouse filter 24. In optional step 216, acid gas components can be removed from gas leaving the condenser 10 using a wet caustic scrubber 26 connected downstream of the condenser 10. In optional step 218, wastewater removed from gas leaving the condenser 10 can be received and treated in a wastewater treatment unit 28 connected to the wet caustic scrubber 26.

In one embodiment, mercury is a contaminant present in the material 2 and during step 204, the mercury is vaporized and during step 208, the mercury (in any form, including elemental mercury and mercury sulfide) is captured in the collected liquids and/or solids. Mercury vapors can be removed from gas leaving the condenser 10 using an absorbent and/or cryogenic treatment unit 30 connected downstream of the condenser 10.

It should be noted that only the components relevant to the disclosure are shown in the figures, and that many other components normally part of a solids treatment system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A method for treating a solid material contaminated with one or more contaminants, comprising:
   a. feeding the solid material to a chamber in communication with a vacuum pump connected to the chamber by an exhaust line;
   b. applying, using a laser, nonconductive and nonconvective heating to a surface of the solid material in the chamber to raise the temperature of the surface of the solid material to at least a volatilization temperature or a decomposition temperature of the one or more contaminants or to a decomposition temperature of one or more compounds in intimate contact with the one or more contaminants without significant heating of air within the chamber such that any heating of the air that may occur will only occur at the surface of the material that is being treated, thereby releasing the one or more contaminants to a gas phase and reducing a concentration of the one or more contaminants in the solid material;
   c. removing an exhaust comprising a gas from the chamber using the exhaust line connected to the chamber;
   d. cooling the exhaust removed from the chamber in a condenser connected to the exhaust line; and
   e. collecting solids and/or liquids in a solids and/or liquids collector connected to the condenser by a first conduit for removing condensed solids and/or liquids containing the one or more contaminants and/or decomposition products of decomposed compounds, the solids and/or liquids collector having a gas outlet wherein the vacuum pump is connected to the gas outlet by a second conduit.

2. The method of claim 1 wherein step (b) is conducted in less than 10 seconds.

3. The method of claim 1 wherein the one or more contaminants comprise mercury, asbestos, lead, silicon, selenium, tellurium, cadmium, perfluoroalkyl substances, polyfluoroalkyl substances, and/or naturally occurring radioactive material.

4. The method of claim 3 wherein the one or more contaminants comprises mercury and during step (b), the mercury is vaporized and the mercury is captured in the collected liquids and/or solids during step (d).

5. The method of claim 1 wherein the solid material is selected from the group consisting of soil, sediment, sludge, spent catalyst, spent absorbents, ceramics, metal particles, metal objects, sheet metal, granulated solid material, binder agglomerated material, sheet material, crystalline material, amorphous material, and combinations thereof.

6. The method of claim 1 wherein the solid material comprises particles having a diameter of 2.0 in or less.

7. The method of claim 1 wherein the surface of the solid material that is heated has a thickness of from 0.3 μm to 1 cm.

8. The method of claim 1 wherein the volatilization temperature of the one or more contaminants or the decomposition temperature of the one or more compounds is at least 200° C.

9. The method of claim 1 wherein the volatilization temperature of the one or more contaminants or the decomposition temperature of the one or more compounds is from 200 to 1000° C.

10. The method of claim 1 further comprising agitating the solid material in the chamber during step (b).

11. The method of claim 1 further comprising monitoring pressure in the second conduit between the vacuum pump and the gas outlet.

12. The method of claim 11 further comprising, in case the pressure is higher than desired, controlling the vacuum pump and/or automatically shutting down the method to reduce the pressure.

13. The method of claim 1 wherein the solid material is fed to the chamber and removed from the chamber continuously.

14. The method of claim 1 further comprising removing dust from gas leaving the condenser using a baghouse filter connected downstream of the condenser.

15. The method of claim 1 further comprising removing acid gas components from gas leaving the condenser using a wet caustic scrubber connected downstream of the condenser and receiving and treating wastewater removed from gas leaving the condenser in a wastewater treatment unit connected to the wet caustic scrubber.

16. The method of claim 1 further comprising removing mercury vapors from gas leaving the condenser using an absorbent and/or cryogenic treatment unit connected downstream of the condenser.

\* \* \* \* \*